US012758970B2

(12) United States Patent
Mehl et al.

(10) Patent No.: US 12,758,970 B2
(45) Date of Patent: Oct. 13, 2026

(54) CONFIGURABLE SUBSTRATE OF A FLUIDIC DEVICE

(71) Applicant: XBIOLOGIX, INC., Corvallis, OR (US)

(72) Inventors: Ryan A. Mehl, Corvallis, OR (US); Eduardo Ceballos, Corvallis, OR (US); Kevin F. Jones, Corvallis, OR (US)

(73) Assignee: xBiologix, Inc., Corvallis, OR (US)

( * ) Notice: Subject to any disclaimer, the term of this patent is extended or adjusted under 35 U.S.C. 154(b) by 664 days.

(21) Appl. No.: 18/037,168

(22) PCT Filed: Nov. 18, 2021

(86) PCT No.: PCT/US2021/059798
§ 371 (c)(1),
(2) Date: May 16, 2023

(87) PCT Pub. No.: WO2022/109075
PCT Pub. Date: May 27, 2022

(65) Prior Publication Data
US 2023/0405581 A1 Dec. 21, 2023

Related U.S. Application Data

(60) Provisional application No. 63/115,004, filed on Nov. 17, 2020.

(51) Int. Cl.
*B01L 3/00* (2006.01)

(52) U.S. Cl.
CPC .............................. *B01L 3/502707* (2013.01)

(58) Field of Classification Search
CPC ................ B01L 3/502707; C07K 1/04; G01N 33/54353
See application file for complete search history.

(56) References Cited

U.S. PATENT DOCUMENTS

| | | | |
|---|---|---|---|
| 2009/0264317 A1 | 10/2009 | Ofir et al. | |
| 2017/0184583 A1 | 6/2017 | Beaumont et al. | |
| 2017/0216840 A1 | 8/2017 | Branch et al. | |
| 2018/0257070 A1 | 9/2018 | Babcock | |
| 2019/0091688 A1 * | 3/2019 | Bandara | B01L 3/502753 |
| 2021/0072238 A1 | 3/2021 | Mehl et al. | |

OTHER PUBLICATIONS

Bednar et al., "Immobilization of Proteins with Controlled Load and Orientations", ACS Applied Materials & Interfaces, Sep. 26, 2019, vol. 11, No. 40, pp. 36391-36398.

(Continued)

*Primary Examiner* — Kathryn Elizabeth Limbaugh
(74) *Attorney, Agent, or Firm* — Dicke, Billig & Czaja, PLLC

(57) ABSTRACT

A method of forming a configurable substrate includes depositing a volume of trans-cyclooctene on a configurable substrate of a fluidic device, and forming a bioorthogonal tethered protein on the configurable substrate. The bioorthogonal tethered protein may be formed by attaching a tetrazine-modified protein or tetrazine-modified functional protein fragment to the trans-cyclooctene, wherein the tetrazine-modified protein or tetrazine-modified functional protein fragment is configured to bind to a target analyte.

20 Claims, 5 Drawing Sheets

(56) References Cited

OTHER PUBLICATIONS

Chin, Jason W., "Expanding and Reprogramming the Genetic Code", Medical Research Council Laboratory of Molecular Biology, Cambridge CB2 0QH, UK. Department of Chemistry, Cambridge University, Cambridge University, Cambridge CB2 1EW, UK, Oct. 5, 2017, vol. 550 Nature, pp. 8.
Seitchik, et al., "Genetically Encoded Tetrazine Amino Acid Directs Rapid Site-Specific in Vivo Bioorthogonal Ligation with trans-Cycollctenes," Journal of the American Chemical Society, 2012, 134, pp. 2898-2901.
International Search Report and Written Opinion of the International Searching Authority for Application No. PCT/US2021/059798 mailed Feb. 3, 2022, 9 pgs.

* cited by examiner

CONFIGURABLE SUBSTRATE OF A FLUIDIC DEVICE

CROSS-REFERENCE TO RELATED APPLICATIONS

This application is a U.S. National Stage Application under 35 U.S.C. § 371 of PCT/US2021/059798, filed Nov. 18, 2021, which claims benefit to U.S. Provisional Patent Application No. 63/115,004, filed Nov. 17, 2020, which are each incorporated herein by reference in their entireties.

BACKGROUND

Genetic Code Expansion (GCE) enables the encoding of amino acids with diverse chemical properties. This approach has tremendous potential to advance biological discoveries in basic research, medical, and industrial settings. GCE, as a method, enables researchers to add an almost limitless number of new types of amino acid chemical functionality to a protein, in a site-directed manner and within a living cell. The tremendous potential for this method is counterbalanced by the potential caveats in its application to each amino acid, specific protein, or scientific discipline.

Researchers are increasingly engaged in assay development and affinity purification methods for specialized applications and instrumentation. A versatile platform for affinity assays or purification involves immobilizing antibodies or other proteins onto glass surfaces. Various types of assays are used for different types of tests. A variety of biological samples can be tested using these various assays, including urine, saliva, sweat, serum, plasma, whole blood and other fluids. Further, industries in which such assays may be employed include veterinary medicine, human medicine, quality control, product safety in food production, and environmental health and safety. In these areas of utilization, rapid tests are used to screen for animal diseases, pathogens, chemicals, toxins and water pollutants, among others.

DETAILED DESCRIPTION

Figure 1:
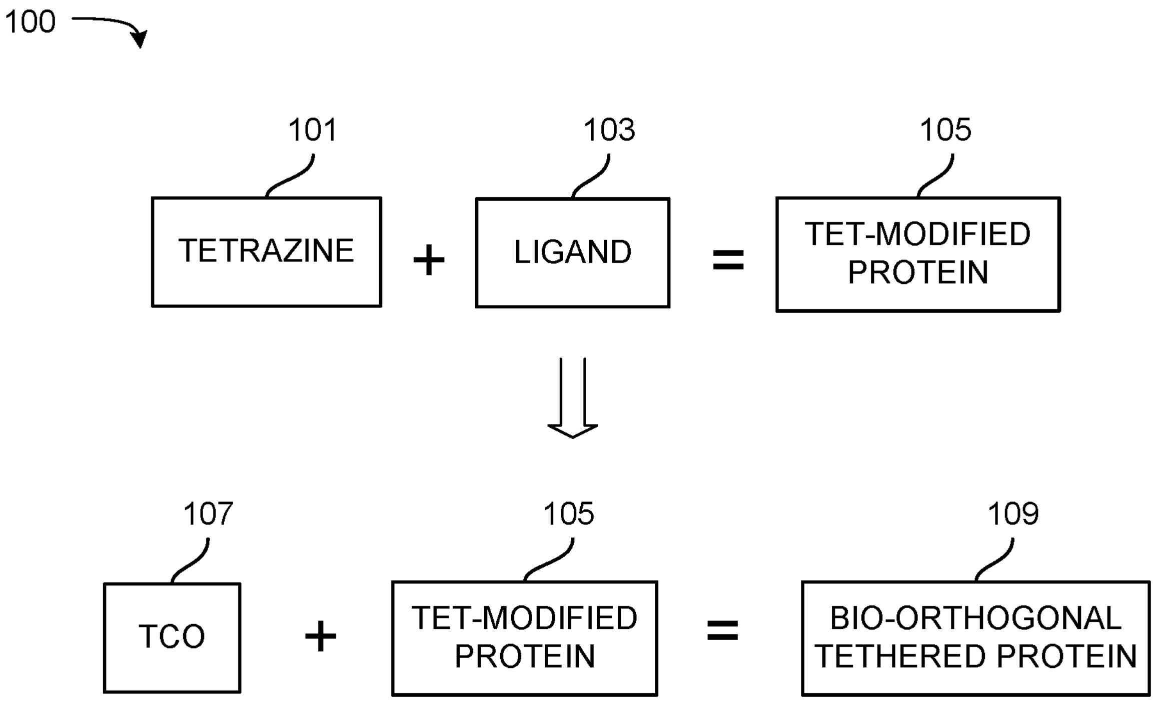
FIG. 1 illustrates a simplified block diagram of a portion of an example method of forming a configurable substrate of a fluidic device, in accordance with the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

In recent years there has been an increasing demand for point-of-care multiple diagnostic assays with multiple test areas allowing the rapid and simultaneous detection of multiple analytes present in samples. It may be desirable that such assays are easy to perform without the use of laboratory investigation, or individuals trained in chemical analysis. Moreover, transmission of pathogens such as influenza, severe acute respiratory syndrome coronavirus 2 (SARS-CoV-2) and others may persist and begin to circulate seasonally. For instance, with regards to COVID-19, (the disease caused by the SARS-CoV-2 virus) sustained, widespread surveillance may be needed for several years to avoid resurgence.

Many diagnostic approaches begin testing after a patient is symptomatic. As an illustration, an infectious disease may have a 3-day latent period in which a patient is infected but asymptomatic. At this point, the patient may have approximately 100 copies of a viral protein in a sample. At day 5, the patient begins exhibiting symptoms, and on day 9 the patient obtains a test. The patient may not receive the results from their testing until around day 14 (e.g., 14 days after they became infected), at which point the patient may have as many as 10ˆ6 copies of the viral protein in a sample. Throughout the entire 14 day period, the patient has been infected and capable of transmitting the infection to persons nearby. As such, testing fora pathogen after a patient begins to display symptoms does not prevent the spread of the infection. Detecting early enough to stop the spread requires testing and diagnosis before symptoms appear, such as when the limit of detection for the pathogen is around 100 virus copies per sample. Accordingly, a need exists for a portable assay device, that is specific for detecting a particular analyte, sensitive enough to detect small volumes of the analyte, and scalable for mass-production and use in a point-of-care setting.

Improved assay performance may be achieved with the use of configurable substrates of a fluidic device, in accordance with the present disclosure. By modifying protein ligands of interest to contain chemically reactive sites at specific locations on a protein, proteins can be oriented on the surface of an assay device so that the binding site is readily available for analyte binding. Through the controlled modification of the sensor surface chemistry, a ligand can be deposited in a uniform manner, reducing the potential for extraneous interference with target binding and overcoming issues with potential mass transport effects. As described more thoroughly herein, configurable substrates of the present disclosure may include the use of noncanonical amino acids, such as a noncanonical amino acid bearing a tetrazine moiety. A noncanonical amino acid bearing a tetrazine moiety may be selectively incorporated into a protein or a functional protein fragment to provide a tetrazine-modified protein or a tetrazine-modified functional protein fragment at an amino acid site selected for modification. The tetrazine-modified protein or a tetrazine-modified functional protein fragment may be tethered to a substrate surface, as described more thoroughly herein.

Nature uses a limited, conservative set of amino acids to synthesize proteins. This limited set includes 20 naturally-occurring amino acids, which are also referred to as canonical amino acids. Protein translation uses transfer ribonucleic acids (tRNAs), which are aminoacylated by aminoacyl-tRNA synthetase enzymes, to read triplet codons in messenger RNAs (mRNAs) via base pairing interactions between the mRNA codon and the anticodon of the tRNA. The ribosome facilitates both the sequential decoding of triplet codons on mRNAs by cognate tRNAs, and the polymerization of the corresponding amino acids into a polypeptide. Unlike small organic molecule synthesis wherein almost any structural change can be made to influence functional properties of a compound, the synthesis of proteins is limited to changes encoded by the twenty natural amino acids. The genetic code of every known organism, from bacteria to human, encodes the same twenty common amino acids. These amino acids can be modified by posttranslational modification of proteins, e.g., glycosylation, phosphorylation or oxidation, or in rarer instances, by the enzymatic modification of aminoacylated suppressor tRNAs, e.g., in the case of selenocysteine. Nonetheless, polypeptides, which are synthesized from only these 20 simple building blocks, carry out all of the complex processes of life. By expanding the genetic code to include additional amino acids with novel biological, chemical or physical properties, the properties of proteins, e.g., the size, acidity, nucleophilicty, hydrogen-bonding, hydrophobic properties and reactivity, can be modified as compared to a protein composed of only amino acids from the 20 common amino acids, e.g., as in a naturally occurring protein.

Noncanonical amino acids have been developed that undergo rapid and selective reactions in cells through inverse electron demand Diels-Alder reactions between strained alkenes or alkynes and tetrazines. One technique in the peptide modification was based on the introduction of genetically encoded noncanonical amino acids into proteins via bioorthogonal tRNA/tRNA-synthetase pairs. In combination with site-specific incorporation of noncanonical amino acid into proteins via genetic code expansion, reactions have emerged as valuable tools for labeling and manipulating proteins in living systems. Reactions have found application for imaging of cell-surface and intracellular proteins, for labeling and identifying proteomes in *E. coli*, mammalian cells, and multicellular organisms as well as for selectively inhibiting a specific target protein within living cells.

Approaches have been developed to expand the genetic code, enabling the co-translational and site-specific incorporation of diverse noncanonical amino acids into proteins synthesized in cells. These noncanonical amino acids are not naturally-occurring amino acids, and therefore expand the genetic code beyond the limited set of 20 naturally-occurring amino acids. As used herein, a noncanonical amino acid refers to or includes an amino acid that is not naturally-occurring, and therefore not among the list of 20 naturally-occurring amino acids. A non-limiting example of a noncanonical amino acid of the present disclosure includes an amino acid that has been genetically encoded to include a tetrazine moiety at a predetermined amino acid site. The phrase "genetically encoded to include a tetrazine moiety at a predetermined amino acid site" refers to or includes a process by which a noncanonical amino acid bearing a tetrazine moiety is selectively incorporated into a protein or a functional protein fragment to provide a tetrazine-modified protein or a tetrazine-modified functional protein fragment at an amino acid site selected for modification. The genetic encoding method can be used to incorporate a noncanonical amino acid bearing a tetrazine moiety during in-cellulo protein synthesis, and/or in a cell-free protein synthesis environment. The genetic encoding method can be used to incorporate a noncanonical amino acid bearing a tetrazine moiety at any site (i.e., amino acid position) in the protein or a functional protein fragment. By virtue of the position of the tetrazine moiety in the tetrazine-modified protein or the tetrazine-modified functional protein fragment, and because of the selective reactivity of the tetrazine moiety with a trans-cyclooctene-modified surface, the orientation of the protein or functional protein fragment on the surface may be controlled. The method allows for control of the presentation of the protein or functional protein fragment on the surface.

As used herein, the term "orthogonal" or "biorthogonal" refers to a molecule (e.g., an orthogonal tRNA (O-tRNA) and/or an orthogonal aminoacyl tRNA synthetase (O—RS)) that functions with endogenous components of a cell with reduced efficiency as compared to a corresponding molecule that is endogenous to the cell or translation system, or that fails to function with endogenous components of the cell. In the context of tRNAs and aminoacyl-tRNA synthetases, orthogonal refers to an inability or reduced efficiency, e.g., less than 20% efficient, less than 10% efficient, less than 5% efficient, or less than 1% efficient, of an orthogonal tRNA to function with an endogenous tRNA synthetase compared to an endogenous tRNA to function with the endogenous tRNA synthetase, or of an orthogonal aminoacyl-tRNA synthetase to function with an endogenous tRNA compared to an endogenous tRNA synthetase to function with the endogenous tRNA. The orthogonal molecule lacks a functional endogenous complementary molecule in the cell. For example, an orthogonal tRNA in a cell is aminoacylated by any endogenous RS of the cell with reduced or even zero efficiency, when compared to aminoacylation of an endogenous tRNA by the endogenous RS. In another example, an orthogonal RS aminoacylates any endogenous tRNA in a cell of interest with reduced or even zero efficiency, as compared to aminoacylation of the endogenous tRNA by an endogenous RS. A second orthogonal molecule can be introduced into the cell that functions with the first orthogonal molecule. For example, an orthogonal tRNA/RS pair includes introduced complementary components that function together in the cell with an efficiency (e.g., 50% efficiency, 60% efficiency, 70% efficiency, 75% efficiency, 80% efficiency, 90% efficiency, 95% efficiency, or 99% or more efficiency) to that of a corresponding tRNA/RS endogenous pair.

In accordance with examples of the present disclosure, a configurable substrate of a fluidic device may include a particular concentration of tethered tet-modified protein that promotes a high rate of analyte binding without inhibition from neighboring ligands. As discussed more thoroughly herein, the concentration of tet-modified protein on the configurable substrate may be selected as a function of the analyte to be detected, and therefore, specific for the assay to be performed. Also consistent with the present disclosure, the binding site of each of the tet-modified proteins may be oriented in a same direction and in a direction specific for the analyte to be detected. By orienting the binding domains of the tet-modified proteins in a particular direction, the binding affinity of the analyte increases, allowing for a more sensitive assay. Yet further, a length of the ligand may be specifically selected to promote analyte binding and limit cross-reactivity with the substrate surface or other surface chemistries.

In accordance with a particular example of the present disclosure, a configurable substrate may be formed, which includes a bioorthogonal tethered protein. The bioorthogonal tethered protein may be formed on a configurable substrate by attaching a tetrazine-modified protein or a tetrazine-modified functional protein fragment to trans-cyclooctene. As used herein, a bioorthogonal tethered protein refers to or includes a tetrazine modified protein or a tetrazine-modified functional protein fragment that has been attached to trans-cyclooctene. Also as used herein, a tetrazine-modified protein or tatrazine-modified functional protein fragment refers to or includes a protein or functional protein fragment that contains a tetrazine (or tetrazines). The bioorthogonal tethered protein may include a ligand configured to bind to a target analyte. A concentration, a length, and an orientation of the bioorthogonal tethered protein may be configurable on the configurable substrate. As used herein, a ligand refers to or includes a molecule that binds to another molecule. Also as used herein, a target analyte refers to or includes a molecule that binds to a ligand.

The tetrazine-modified protein or tetrazine-modified functional protein fragment may be prepared by genetic encoding using a noncanonical amino acid bearing a tetrazine moiety. In some examples, the length, concentration, and orientation of the bioorthogonal tethered protein are selected based on the target analyte to be detected.

In some examples, the method further comprises applying the trans-cyclooctene on a base substrate, and contacting the tetrazine-modified protein or tetrazine-modified functional protein fragment with the deposited trans-cyclooctene. As used herein, a base substrate refers to or includes a solid or porous substance that receives the deposited layers. In some examples, forming the bioorthogonal tethered protein includes depositing a silane coupling agent to at least a portion of the configurable substrate and contacting the trans-cyclooctene with the silane coupling agent. As used herein, a silane coupling agent refers to or includes a silicon containing compound that provides a chemical bond between two dissimilar materials, e.g. glass and an organic compound.

In some examples, forming the bioorthogonal tethered protein includes depositing a volume of the trans-cyclooctene to the configurable substrate in an assay region of a microfluidic device. As used herein, an assay region refers to or includes an area on the substrate where qualitatively assessing or quantitatively measuring the presence, amount, or functional activity of a target entity can be performed. The method may further include attaching the tetrazine-modified protein or tetrazine-modified functional protein fragment to at least a first portion of the trans-cyclooctene. The method may optionally include attaching a tet-poly(ethylene glycol) (tet-PEG) polymer or other tetrazine containing polymer to a second portion of the trans-cyclooctene.

In some examples, forming the bioorthogonal tethered protein includes contacting a first tetrazine-modified protein or tetrazine-modified functional protein fragment with the trans-cyclooctene, and contacting a second tetrazine-modified protein or tetrazine-modified functional protein fragment with the trans-cyclooctene. The method may further include forming at least a portion of a fluidic device by selectively depositing polycaprolactone (PCL) on the configurable substrate.

In accordance with another particular example of the present disclosure, a configurable substrate of a fluidic device comprises an assay region. The assay region of the configurable substrate includes a bioorthogonal tethered protein, wherein the bioorthogonal tethered protein includes a volume of trans-cyclooctene tethered to a surface of the configurable substrate, and a tetrazine-modified protein or tetrazine-modified functional protein fragment tethered to the trans-cyclooctene. As used herein, the phrase "tethered" refers to or includes attaching a protein to another protein or surface by a number of bond modalities. In various examples, the tetrazine-modified protein or tetrazine-modified functional protein fragment includes a ligand configured to bind to a target analyte. As described herein, a concentration, a length, and an orientation of the bioorthogonal tethered protein are configurable on the configurable substrate.

In some examples, the tetrazine-modified protein or tetrazine-modified functional protein fragment is attached to the trans-cyclooctene in a configured orientation to permit binding of the target analyte. Additionally, the bioorthogonal tethered protein may include a configured length of the tetrazine-modified protein or tetrazine-modified functional protein fragment comprising a chain of a plurality of binding domains to the analyte.

In accordance with another particular example of the present disclosure, a method of forming a configurable substrate includes depositing a volume of trans-cyclooctene on an assay region of a configurable substrate of a fluidic device, and forming a bioorthogonal tethered protein on the configurable substrate. The bioorthogonal tethered protein may be formed by attaching a tetrazine-modified protein or tetrazine-modified functional protein fragment to the trans-cyclooctene, wherein the tetrazine-modified protein or tetrazine-modified functional protein fragment is configured to bind to a target analyte.

In some examples, forming the bioorthogonal tethered protein includes attaching the tetrazine-modified protein or tetrazine-modified functional protein fragment to the trans-cyclooctene in a configured orientation to permit binding of the target analyte. In some examples, forming the bioorthogonal tethered protein includes attaching a configured length of the tetrazine-modified protein or tetrazine-modified functional protein fragment comprising a chain of a plurality of binding domains to the analyte.

In various examples, depositing the volume of trans-cyclooctene on the assay region includes selectively applying the trans-cyclooctene to the assay region of the configurable substrate. For instance, selectively applying the trans-cyclooctene to the assay region of the configurable substrate includes: selectively applying a silane coupling agent to the assay region of the configurable substrate, and attaching the trans-cyclooctene to the saline coupling agent.

In some examples, depositing the volume of trans-cyclooctene on the assay region includes selectively applying the trans-cyclooctene to the assay region of the configurable substrate in a configured concentration to permit binding of the target analyte. In some examples, the method further comprises forming a tet-poly(ethylene glycol) (tet-PEG), and selectively attaching the tet-PEG to the trans-cyclooctene. Similarly, the method may comprise attaching the ethanolamine, or amine reactive site blocking agent to the amine reactive sites. In some examples, the bioorthogonal tethered protein includes the tetrazine-modified protein or tetrazine-modified functional protein fragment in a configured orientation.

Turning now to the Figures, FIG. 1 illustrates a simplified block diagram of a portion of an example method of forming a configurable substrate of a fluidic device, in accordance with the present disclosure.

In accordance with a particular example of the present disclosure, a configurable substrate may be formed, which includes a bioorthogonal tethered protein. The bioorthogonal tethered protein may be formed on a configurable substrate by attaching a tetrazine-modified protein or a tetrazine-modified functional protein fragment to trans-cyclooctene. The bioorthogonal tethered protein may include a ligand configured to bind to a target analyte. As discussed herein, a concentration, a length, and an orientation of the bioorthogonal tethered protein may be configurable on the configurable substrate. In various examples, the substrate may be configurable in the types, and amounts, of analytes that may be detected (e.g., bound) to the surface. For instance, the substrate may be configured to detect and/or bind a single analyte in a sample (such as the SARS-CoV2 virus), and/or may be configured to detect a plurality of analytes in the sample (such as the SARS-CoV 2 virus, influenza A, and influenza B).

Protein translation uses transfer ribonucleic acids (tRNAs), which are aminoacylated by aminoacyl-tRNA synthetase enzymes, to read triplet codons in messenger RNAs (mRNAs) via base pairing interactions between the mRNA codon and the anticodon of the tRNA. In the example illustrated in FIG. 1, a noncanonical amino acid such as a tetrazine 101 or tetrazine moiety may be site-specifically incorporated with a ligand 103 to form a tetrazine-modified protein or a tetrazine-modified functional protein fragment by attaching the tetrazine 101 or tetrazine moiety to a selector codon (e.g., STOP codon) of a gene. The resultant combination of the tetrazine 101 or tetrazine moiety with the ligand 103 is a tetrazine-modified protein or a tetrazine-modified functional protein fragment 105.

The ligand may include a protein or other receptor molecule that may bind to the target analyte. As used herein, a ligand includes a molecule that binds to a target analyte. An analyte includes the molecule that is being detected and/or measured, such as protein of a virus, compound, and/or other pathogens. For more general information on proteins attached to Tet, and specific information on example Tet structures, reference is made to US Patent Publication 2019/0077776, published on Mar. 14, 2019, and entitled "Reagents and methods for bioorthogonal labeling of biomolecules in living cells", and International Application PCT/US2014/060169, published on Apr. 16, 2015, and entitled "Modified amino acids comprising tetrazine functional groups, methods of preparation, and methods of their use", which are herein incorporated by reference in entirety for their teachings.

Non-limiting examples of a ligand 103 (or polypeptide of interest) include, but are not limited to, a cytokine, a growth factor, a growth factor receptor, an interferon, an interleukin, an inflammatory molecule, an oncogene product, a peptide hormone, a signal transduction molecule, a steroid hormone receptor, erythropoietin (EPO), insulin, human growth hormone, an alpha-1 antitrypsin, an angiostatin, an antihemolytic factor, an antibody, an antigen, an enzyme, an apolipoprotein, an apoprotein, an atrial natriuretic factor, an atrial natriuretic polypeptide, an atrial peptide, a C-X-C chemokine, T39765, NAP-2, ENA-78, a Gro-a, a Gro-b, a Gro-c, an IP-10, a GCP-2, an NAP-4, an SDF-1, a PF4, a MIG, a calcitonin, a c-kit ligand, a cytokine, a CC chemokine, a monocyte chemoattractant protein-1, a monocyte chemoattractant protein-2, a monocyte chemoattractant protein-3, a monocyte inflammatory protein-1 alpha, a monocyte inflammatory protein-1 beta, RANTES, 1309, R83915, R91733, HCC1, T58847, D31065, T64262, a CD40, a CD40 ligand, a C-kit Ligand, a collagen, a colony stimulating factor (CSF), a complement factor 5a, a complement inhibitor, a complement receptor 1, a cytokine, DHFR, an epithelial neutrophil activating peptide-78, a GRO alpha/MGSA, a GRO beta, a GRO gamma, a MIP-1 alpha, a MIP-1 delta, a MCP-1, an epidermal growth factor (EGF), an epithelial neutrophil activating peptide, an erythropoietin (EPO), an exfoliating toxin, a Factor IX, a Factor VII, a Factor VIII, a Factor X, a fibroblast growth factor (FGF), a fibrinogen, a fibronectin, a G-CSF, a GM-CSF, a glucocerebrosidase, a gonadotropin, a growth factor, a growth factor receptor, a hedgehog protein, a hemoglobin, a hepatocyte growth factor (HGF), a hirudin, a human serum albumin, an ICAM-1, an ICAM-1 receptor, an LFA-1, an LFA-1 receptor, an insulin, an insulin-like growth factor (IGF), an IGF-I, an IGF-II, an interferon, an IFN-alpha, an IFN-beta, an IFN-gamma, an interleukin, an IL-1, an IL-2, an IL-3, an IL-4, an IL-5, an IL-6, an IL-7, an IL-8, an IL-9, an IL-10, an IL-11, an IL-12, a keratinocyte growth factor (KGF), a lactoferrin, a leukemia inhibitory factor, a luciferase, a neurturin, a neutrophil inhibitory factor (NIF), an oncostatin M, an osteogenic protein, an oncogene product, a parathyroid hormone, a PD-ECSF, a PDGF, a peptide hormone, a human growth hormone, a pleiotropin, a protein A, a protein G, a pyrogenic exotoxins A, B, or C, a relaxin, a renin, an SCF, a soluble complement receptor I, a soluble I-CAM 1, a soluble interleukin receptors, a soluble TNF receptor, a somatomedin, a somatostatin, a somatotropin, a streptokinase, a superantigen, a staphylococcal enterotoxin, an SEA, an SEB, an SEC1, an SEC2, an SEC3, an SED, an SEE, a steroid hormone receptor, a superoxide dismutase (SOD), a toxic shock syndrome toxin, a thymosin alpha 1, a tissue plasminogen activator, a tumor growth factor (TGF), a TGF-alpha, a TGF-beta, a tumor necrosis factor, a tumor necrosis factor alpha, a tumor necrosis factor beta, a tumor necrosis factor receptor (TNFR), a VLA-4 protein, a VCAM-1 protein, a vascular endothelial growth factor (VEGEF), a urokinase, a Mos, a Ras, a Raf, a Met; a p53, a Tat, a Fos, a Myc, a Jun, a Myb, a Rel, an estrogen receptor, a progesterone receptor, a testosterone receptor, an aldosterone receptor, an LDL receptor, a SCF/c-Kit, a CD40L/CD40, a VLA-4/VCAM-1, an ICAM-1/LFA-1, a hyalurin/CD44, a corticosterone, a protein present in Genebank or other available databases, and/or a portion thereof.

The tetrazine-modified protein or tetrazine-modified functional protein fragment may be prepared by genetic encoding using a non-canonical amino acid bearing a tetrazine moiety. For instance, referring to FIG. 1, the tetrazine-modified protein or tetrazine-modified functional protein fragment may be genetically encoded to include a ligand 103. Using an orthogonal aminoacyl-tRNA synthetase and an orthogonal tRNA, the noncanonical amino acid (in this case, a tetrazine or tetrazine moiety) a tetrazine-modified protein or tetrazine-modified functional protein fragment may be prepared that includes both the tetrazine 101 (or tetrazine moiety) and the ligand 103. In various examples, the ligand 103 includes a fragment or portion of the protein. For instance, a fragment of protein A may comprise the ligand 103, and the fragment of protein A may be genetically encoded to include the tetrazine 101 or tetrazine moiety to generate the tetrazine-modified protein or tetrazine-modified functional protein fragment 105.

Figure 2:
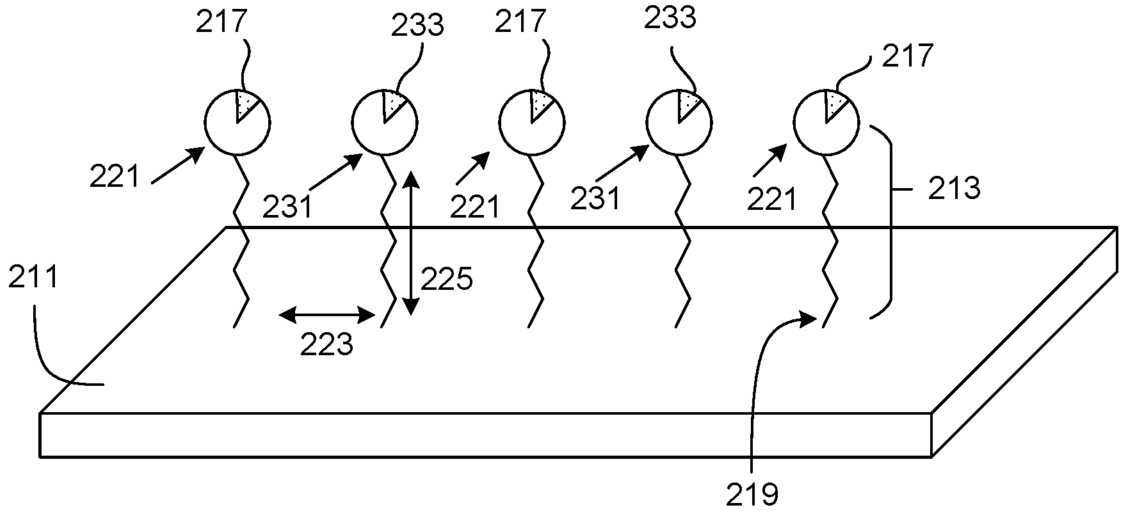
FIG. 2 illustrates a simplified block diagram of an example configurable substrate, in accordance with the present disclosure.

FIG. 2 illustrates a simplified block diagram of an example configurable substrate, in accordance with the present disclosure. As described with regards to FIG. 1, various methods of the present disclosure include forming a bioorthogonal tethered protein on a configurable substrate by attaching a tetrazine-modified protein or a tetrazine-modified functional protein fragment to trans-cyclooctene. The tetrazine-modified protein or a tetrazine-modified functional protein fragment may be formed by contacting a tetrazine molecule with a ligand. The combination of the trans-cyclooctene and tetrazine-modified protein or tetrazine-modified functional protein fragment may provide for ordered deposition of the ligand. For example, the ordered deposition may result in each ligand being positioned with the analyte binding site in a particular orientation. For example, the analyte binding site of each ligand may be facing or standing up. Through the controlled orientation, each binding site of the bound protein may be oriented in the same way, which may provide for optimization of the binding affinity (e.g., Kd) and which may prevent or mitigate non-specific binding and/or provide a 100-1000 fold improvement in detection indicator signal. Trans-cyclooctene (TCO), as used herein, may include TCO and/or strained TCO (sTCO).

In some examples, the method further comprises selectively depositing the trans-cyclooctene on a base substrate, and contacting the tetrazine-modified protein or tetrazine-modified functional protein fragment with the deposited trans-cyclooctene. For example, a base substrate 211 may be formed of one or more of glass, glass microfibers (GMF), a polymer, polypropylene, paper, metal, metal fibers, carbon nanotube fibers (CNTF), non-woven material, plasma treated material, and silicon. In various examples, the substrate is described as including a porous membrane.

As illustrated in FIG. 2, a plurality of bioorthogonal tethered proteins 213 may be tethered to the base substrate 211. Each bioorthogonal tethered protein 213 includes a ligand 221 capable of binding an analyte 217, and a tether 219. In some examples, the length, concentration, and orientation of the bioorthogonal tethered protein 213 are selected based on the target analyte to be detected. For instance, the plurality of bioorthogonal tethered proteins 213 may be formed on the substrate 211 in such a manner that the orientation 221 of a binding domain of each of the ligands 221 is facing in a same direction (as illustrated). Similarly, the plurality of bioorthogonal tethered proteins 213 may be formed on the substrate 211 in a manner such that the concentration 223 of the bioorthogonal tethered proteins 213 on the substrate 211 allow for each of the bioorthogonal tethered proteins 213 to bind to an analyte 217. Yet further, the plurality of bioorthogonal tethered proteins 213 may be formed on the substrate 211 in a manner such that the length 225 of the bioorthogonal tethered proteins 213 on the substrate 211 allow for each of the bioorthogonal tethered proteins 213 to bind to an analyte 217. Orientation of the ligands may be important for a variety of assays. For example, for catalytic reactions, the products of the reaction may be harvested, such as electrons that are produced by oxygen reduction. For example, lactate oxidase emits an electron when it converts lactose to pyruvate. By orienting the lactate oxidase so that the electrons may be harvested, the assays may provide a quantitative signal indicative of the concentration of lactate. The lactate-to-pyruvate reaction is important for human health and is also an indication of serious trauma.

In some examples, the bioorthogonal tethered protein is selectively formed on the configurable substrate. In such examples, forming the bioorthogonal tethered protein includes depositing a silane coupling agent to at least a portion of the configurable substrate (e.g., substrate 211) and contacting the trans-cyclooctene with the silane coupling agent. As a specific example, a silane coupling agent may be deposited on the substrate 211 and the substrate 211 may be treated with trans-cyclooctene, resulting in the trans-cyclooctene binding to the silane coupling agent. Examples are not so limited, and the trans-cyclooctene may be bound directly to the surface of the substrate 211 via functionalization of the trans-cyclooctene or other surface functionalization methods. A non-limiting example of a silane coupling agent includes trimethoxysilane. In various examples, depositing the TCO includes depositing a silane coupling agent to a particular region of the substrate (such as an assay region of the substrate) and binding a volume of TCO to the silane coupling agent. In some examples, The TCO may also be bound directly to the surface via functionalization of the TCO or other surface functionalization methods.

As illustrated in FIG. 2, a plurality of different ligands may be tethered to the substrate 211, which allows for a multiplexed assay device.

For instance, the configurable substrate 211 may include a first tetrazine-modified protein or tetrazine-modified functional protein fragment that includes a first ligand (221), and a second tetrazine-modified protein or tetrazine-modified functional protein fragment that includes a second ligand (231). The first tetrazine-modified protein or tetrazine-modified functional protein fragment including the first ligand 221 may bind to a first analyte 217. The second tetrazine-modified protein or tetrazine-modified functional protein fragment including the second ligand 231 may bind to a second analyte 233. By combining multiple tetrazine-modified protein or tetrazine-modified functional protein fragments on a same configurable substrate, an assay device of the present disclosure can increase the dynamic range of detection and/or detection of all isotypes on a single assay device. In addition, assay devices of the present disclosure can include proteins of different affinities for a given analyte, which also provides for a wider range of binding activity on the assay device. As such, in some examples, forming the bioorthogonal tethered protein includes contacting a first tetrazine-modified protein or tetrazine-modified functional protein fragment with the trans-cyclooctene, and contacting a second tetrazine-modified protein or tetrazine-modified functional protein fragment with the trans-cyclooctene. In some examples the first analyte and the second analyte may be different, such that different analytes may be detected on a same assay device. In some examples, the first analyte and the second analyte may be the same.

Figure 3:
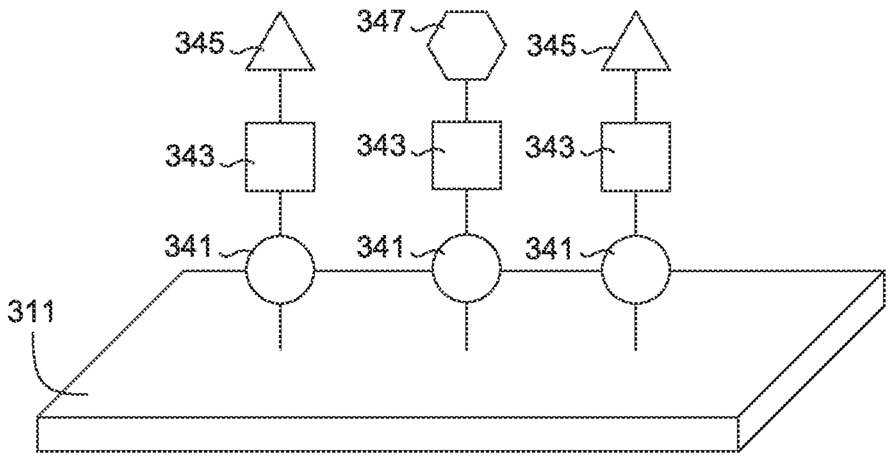
FIG. 3 illustrates a simplified block diagram of an example configurable substrate with a tet-poly(ethylene glycol) (tet-PEG) polymer, in accordance with the present disclosure.

FIG. 3 illustrates a simplified block diagram of an example configurable substrate with a tet-poly(ethylene glycol) (tet-PEG) polymer, in accordance with the present disclosure. Similar to the example illustrated in FIG. 2, the configurable substrate 311 includes a plurality of bioorthogonal tethered proteins. The Tet-PEG may prevent non-specific binding to particular aspects of the substrate, in effect reducing signal noise. For example, the configurable substrate 311 illustrated in FIG. 3 includes three tethered molecules. Each of the tethered molecules include a trans-cyclooctene molecule 341 tethered to the configurable substrate 311, and a tetrazine or tetrazine fragment 343 tethered to the trans-cyclooctene molecule 341. In the example illustrated in FIG. 3, tet-PEG and tetrazine-modified protein are in parallel, both tethered to the substrate via TCO. A poly(ethylene glycol) (PEG) molecule 345 is tethered to a tetrazine or tetrazine fragment 343. The third bioorthogonal tethered protein illustrated in FIG. 3 includes a ligand 347 tethered to a tetrazine or tetrazine fragment 343. The PEG polymer may optionally be attached to remaining TCO that are not attached to the tetrazine-modified protein, and which may mitigate or prevent non-specific binding to TCO. The PEG polymer may provide a wider dynamic range and allow for keeping the sample undiluted, such that quantitative results may be obtained.

As used herein, designations of "first" and "second" are used to refer to one element and another of the same element, or of a different type, without reference to temporal order. As such, a first portion of the TCO may be tethered to a ligand whereas a second portion of the TCO may be tethered to PEG, without reference to a temporal order of deposition. In some examples, the order of deposition of ligand and PEG may be specified. For instance, in some examples, the agents may be loaded on the assay device by first treating the surface of the substrate with NaOH, followed by trimethoxysilane/toluene and which results in trimethoxysilane bound on the surface. The surface is then treated with TCO—NH2, resulting in TCO bound to the trimethoxysilane. The surface is then treated with the tetrazine-modified protein and the Tet-PEG polymer (if relevant), resulting in the tetrazine-modified protein being tethered to a portion of the volume of TCO and Tet-PEG polymer being bound to the remaining portion of the volume of TCO (if relevant).

Accordingly, in some examples, forming the bioorthogonal tethered protein includes depositing a volume of the trans-cyclooctene (e.g., 341 illustrated in FIG. 3) to the configurable substrate (e.g., 311 illustrated in FIG. 3) in an assay region of fluidic device. The method may further include attaching the tetrazine-modified protein or tetrazine-modified functional protein fragment (e.g., 343 and 347 illustrated in FIG. 3) to at least a first portion of the trans-cyclooctene. The method may optionally include attaching a tet-poly(ethylene glycol) (tet-PEG) polymer to a second portion of the trans-cyclooctene. As used herein, an assay region of the fluidic device refers to or includes a region of the device capable of binding to an analyte and performing a quantitative or qualitative analysis of a sample disposed thereon. Additional and/or different molecules may be used to modify the remaining space of the configurable substrate. For instance, in some examples, an ethanolamine may be used to block amine reactive sites.

The assay region may contain a control area. The control area is to verify that the reagents function properly in the absence of the analyte. In the case of detecting IgG, various chemistries may be explored to immobilize anti-immunoglobulin G (IgG) on the porous membrane and tested with the protein binding assay. The anti-IgG loading and hydrophilicity (which determines the incubation time) of the membrane may be optimized to obtain the maximum color intensity. Both test and control areas may be evaluated for compatibility with an enhanced polydopamine development method.

In some examples, the bioorthogonal tethered protein includes the tetrazine-modified protein or tetrazine-modified functional protein fragment in a configured orientation. As used herein, "bioorthogonal" may include or refer to the amino acid tether embedded in the protein structure having no (or minimal) effect on the folding or activity of the ligand. In some examples, the amino acid tether may be at any site of the ligand, and as such, the orientation of the protein may be controlled. For example, the ligand protein may be oriented so it binds optimally with its binding partner (e.g., by putting the tether on the far side of the protein, relative to the binding domain); or the opposite, and the tether may be placed close to the binding domain (so that the binding domain faces the surface, as far as possible from receptor domain of the binding partner). As the orientation of the ligands follow from the site-specific attachment of the Tet and the bioorthogonal properties, each of the ligands that are immobilized are oriented in the same way on the surface of the substrate, resulting in a uniform biomolecular monolayer of biologic agents. Also, as used herein, the term "bioorthogonal tethered" or "bioorthogonally tethered" with regards to the protein refers to or includes a protein that contains a tetrazine moiety, or other type of moiety, which is capable of being tethered to a surface or has been tethered to a surface bioorthogonally.

In various examples, a fluidic device may be formed, which includes the configurable substrate described herein. For instance, a fluidic device (also referred to herein as an "assay device") may start with a liquid sample (or its extract) containing an analyte of interest. The liquid sample may move without the assistance of external forces (capillary action) through various zones on which molecules can interact with the fluidic device. Non-limiting examples of a fluidic device may include a test strip, a microfluidic device with microfluidic channels, and other assay devices. Example assays include lateral flow assay (LFA), enzyme-linked immunosorbent assay (ELISA), chemiluminescent immunoassays, among other plate assays or other types of assay tests, such as isotopic immunoassay, fluoroimmunoassay, biolayer interferometry (BLI) assays, radioimmunoassay, microbiologic assays, quantal or graded bioassays, and others. The sample may be applied at one end of the fluidic device, and the sample may migrate through the various zones in the fluidic device, and recognition of the analyte results in a response on the test area, while a response on a control area indicates the proper liquid flow through the fluidic device. The sample may also be introduced to the assay region without going through various zones by being directed immediately to an assay region. The read-out, which may indicate a qualitative or quantitative assessment of the analyte, may be assessed by eye or using a dedicated reader. In order to test multiple analytes simultaneously under the same conditions, additional test areas of ligands specific to different analytes can be immobilized in an array format. On the other hand, multiple test areas loaded with the same ligand can be used for semi-quantitative assays.

The phrase "genetically encoded to include a tetrazine moiety at a predetermined amino acid site" refers to the process described herein by which a non-canonical amino acid bearing a tetrazine moiety is selectively incorporated into a protein or a functional protein fragment to provide a tetrazine-modified protein or a tetrazine-modified functional protein fragment at an amino acid site selected for modification. The genetic encoding method described herein can be used to incorporate a non-canonical amino acid bearing a tetrazine moiety at any site (i.e., amino acid position) in the protein or a functional protein fragment. By virtue of the position of the tetrazine moiety in the tetrazine-modified protein or the tetrazine-modified functional protein fragment, and because of the selective reactivity of the tetrazine moiety with the trans-cyclooctene-modified surface, the orientation of the protein or functional protein fragment on the surface is controlled. The method allows for control of the presentation of the protein or functional protein fragment on the surface.

In various examples, the assay device may be formed at least in part by forming fluidic channels on the configurable substrate. In a number of examples, the substrate may be configured to include a plurality of fluidic channels capable of delivering a test sample and/or a reagent to particular regions on the substrate in a particular sequence. The fluidic channels may be formed by a number of different methods. For instance, the fluidic channels may be formed by masking and coating, porous material permeation (dispensing material onto the substrate outside of the areas receiving the reagents), chemical etching, laser etching, surface deposition, printing, and by depositing material onto the substrate outside of the areas receiving the reagents, among other fabrication methods. Additionally, a hydrophobic barrier may be created. Accordingly, forming a fluidic device as described herein may include patterning the substrate to include a plurality of regions including the assay region and a plurality of channels connected to the assay region using a hydrophobic or hydrophilic material, and depositing a plurality of reagents on at least a subset of the plurality of regions. As a non-limiting example, the method may include forming at least a portion of a fluidic device by selectively depositing polycaprolactone (PCL) on the configurable substrate.

In some examples, the tetrazine-modified protein or tetrazine-modified functional protein fragment is attached to the trans-cyclooctene in a configured orientation to permit binding of the target analyte. Additionally, the bioorthogonal tethered protein includes a configured length of the tetrazine-modified protein or tetrazine-modified functional protein fragment comprising a chain of a plurality of binding domains to the analyte. For instance, referring to FIG. 3, the ligand 347 may be repeated a number of times, such as three times, resulting in a chain of binding domains for the analyte of interest.

A configurable substrate of a fluidic device is described herein. In accordance with examples of the present disclosure, a fluidic device may be manufactured in a scalable manner, resulting in varied size and numbers of assay devices, such as a micro lateral flow assay (μLFA). As used herein, a micro lateral flow assay refers to or includes an assay device that is capable of detecting pico to femtograms of pathogens, yet scales like a lateral flow assay (LFA). In various examples, the assay device may be fabricated using a substrate that has been functionalized to attach to a tetrazine (Tet) tethered protein. More specifically, the substrate of the assay device may be configured for a particular assay, so as to maximize binding affinity of an analyte. The substrate may be specifically configured with bioorthogonal tethered proteins that have a particular density (e.g., concentration on the substrate surface), a particular length, and a particular orientation for an analyte of interest. As described more thoroughly herein, proteins may be tethered to the substrate using tetrazine (Tet). For more general information on proteins attached to Tet, and techniques to immobilize tetrazine on porous membranes, reference is made to US Patent Publication 2021/0072238, published on Mar. 11, 2021, and entitled "Immobilization of proteins with controlled orientation and load", which is herein incorporated by reference in its entirety for its teachings. The preparation of representative tetrazine non-canonical amino acids, methods for genetic encoding proteins and polypeptides using the tetrazine non-canonical amino acids, and proteins and polypeptides comprising the tetrazine non-canonical amino acids is described in WO 2016/176689 (PCT/US2016/030469), expressly incorporated herein by reference in its entirety.

Generally, manufacturing an assay device includes a plurality of steps that may be performed in various orders. As described more thoroughly herein, the method includes creating an area where reagents will be dispensed onto the substrate. These areas may be channels or wells of various shapes and/or sizes, formed using a variety of techniques. In various examples, the area where reagents will be dispensed are referred to as fluidic channels. Fluidic channels, as used herein, include fabricated pathways created on the substrate (e.g., membrane) through which fluid can flow or otherwise move within. In some examples, the fluidic channels may be microchannels or nanochannels, such as channels having dimension in the micron range (e.g., less than 1 mm to around 1 μm) or nanometer range (e.g., less than 1 μm to around 1 nm). In some specific examples, the fluidic channels may be 1-10 cm long. In further examples, the fluidic channels may include one or more wells or chambers.

A variety of different pathogens may be detected using example assays described herein. Example pathogens include, but are not limited to, viruses and bacteria, such as coronaviruses (e.g., COVID-19), Ebola, dengue, human immunodeficiency virus (HIV), Hantavirus, Lyme disease, Japanese encephalitis, Lassa fever, rabies, Middle Eastern Respiratory Syndrome (MERS), Severe Acute Respiratory Syndrome (SARS), rotavirus, Hepatitis C, yellow fever, Rift Valley fever, Crimean-*Congo* hemorrhagic fever and other Arenaviruses, *Clostridioides difficile, Candida auris*, Carbapenem-resistant *Acinetobacter*, Carbapenem-resistant Enterobacteriaceae, Drug-resistant *Neisseria gonorrhoeae*, Drug-resistant Camplyobacter, Drug-resistant *Candida*, ESBL-producing Enterobacteriaceae, Vancomycin-resistant Enterococci (VRE), Drug-resistant nontyphoidal *Salmonella*, Drug-resistant *Salmonella* serotype *Typhi*, Drug-resistant *Shigella*, Methicillin-resistant *Staphylococcus aureus* (MRSA), Drug-resistant *Streptococcus pneumoniae*, Drug-resistant Tuberculosis, Erythomycin-resistant Group A *Streptococcus*, Clindamycin-resistant Group B *Streptococcus*, Azole-resistant *Aspergillus fumigatus*, Drug-resistant *Mycoplasma genitalium*, Drug-resistant *Bordetella pertussis*. For more general and specific information on example super bugs, reference is made to https://www.cdc.gov/drugresistance/biggest-threats.html, which is incorporated herein by reference in its entirety.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

Experimental/More Detailed Embodiments

As further illustrated below in connection with the experimental embodiments, a configurable substrate for a fluidic device was modeled and tested, evidencing the capability to form a fluidic device capable of detecting a particular analyte, sensitive enough to detect small volumes of the analyte, and scalable for mass-production and use in a point-of-care setting.

In forming a fluidic device, reagents were deposited in fluidic channels and/or wells of the fluidic device. The reagents were configured to create a detectable indicator signal. The detection reagents included a molecular substrate (MS), which reacted with a conjugate to form a detectable indicator, and various amplification enhancement reagents. As used herein, a MS includes a chemical species or molecule in a chemical reaction that reacts with a reagent to generate a product (e.g., it is modified). A detectable indicator, as used herein, includes a molecule or other chemical product which may be detected, such as via optical, electrical, radiometric, or other types of detection. The detectable indicator included the product of the reaction between the MS and the detection enzyme forming part of the conjugate.

The enzyme-MS pairs include horseradish peroxidase (HRP/H2O2) and 3,3'5,5'-Tetramethylbenzidine (TMB), HRP/H2O2 and 3,3'-Diaminobenzidine (DAB), HRP/H2O2 and 2,2'-azino-bis(3-ethylbenzothiazoline-6-sulfonic acid) (ABTS), HRP/H2O2 and o-phenylenediamine dihydrochloride, Alkaline phosphatase and p-Nitrophenyl Phosphate (PNPP), and beta-galactosidase and o-nitrophenyl-β-D-galactopyr (ONGP). The plurality of amplification enhancement reagents included reagents that amplify the reaction between the enzyme and MS, such as an additional volume of the enzyme, peroxide, dopamine, biotin, streptavidin-polyHRP, among other reagents. In examples that included the use of HRP, peroxide was used, which was catalyzed by HRP. The conjugate included HRP bound to an antibody, wherein the antibody was bound to the analyte if present in the sample. TMB interacted with the HRP/H2O2 to produce a color change in the TMB, which formed a detectable indicator. An additional amount of HRP, peroxide, as well as dopamine, biotin and/or streptavidin-polyHRP, was used to amplify the reaction between HRP/H2O2 and TMB.

As described above, one or more of the detection reagents (e.g., the MS and the amplification enhancement reagents) reacted with the conjugate to form a detectable indicator that was used to detect the presence of the analyte in the sample. The detectable indicator may include an optical indicator (e.g., visual, CCD detectable, detection using smartphone and enhanced with digital manipulation application, fluorescence, chemiluminescent), an electrical indicator (e.g., Amperometric, potentiometric, impedance), a radiometric indicator (e.g., Geiger counter, x-ray file, etc.), and/or a Plasmon Resonance (SERS). The plurality of reagents may include the conjugate that includes a detection molecule/antibody bound to second molecule (e.g., detection enzyme), wherein the detection molecule is configured to bind to the analyte when present in the sample, and a MS configured to interact with the conjugate (e.g., peroxide/TMB or other MS) to form a detectable indicator used to detect the presence of the analyte.

In various examples, a digital dispensing device was used for reagent printing and was used in validating and manufacturing the assay device. Solutions for a protein loading and color developing protocol consistent with the present disclosure are included below in Tables 1 and 2.

TABLE 1

Reagents for Protein Loading Protocol

| Reagent/Reagent mixture | Viscosity at 25° C. (mPa · s) | Thermal stability |
|---|---|---|
| Water | 0.89 | b.p. 100° C. |
| Ethanol | 0.98 | b.p. 78.37° C. |
| 2M NaOH | >0.89 | b.p. 100° C. |
| TCO-amine in ethanol | ~0.98 | Stable at 4° C. (pH = 7) |
| Protein A/PO4/NaCl (aq) | >0.89 | <25° C. |
| Tet-PEG/PO4/NaCl (aq) | ~0.89 | ~25° C. |
| Tween buffer | >0.89 | c.p. 76° C. |
| 2% silane in toluene | ~0.56 | b.p. 110.6° C. |
| 15% sucrose in water | >0.89 | <100° C. |

TABLE 2

Reagents for Color Developing Assay

| Reagent/Reagent mixture | Viscosity at 25° C. (mPa · s) | Thermal stability |
|---|---|---|
| PBS | ~0.89 | Stable <100° C. |
| Conjugate (aq) | >0.89 | <25° C. |
| Anti-conjugate (aq) | >0.89 | <25° C. |
| Dopamine (HCl) (aq) | ~0.89 | <25° C. |
| Peroxide (In citrate buffer) | ~0.89 | <35° C. |
| HRP (aq) | >0.89 | <25° C. |
| TMB (aq) | ~0.89 | ~25° C. |

Note that the following are abbreviations: (aq) is for aqueous, b.p is for boiling point, and c.p. is for cloud point.

To perform the BLI assay, APS tips were rinsed in 100 μL water, followed by rinsing in 100 μL ethanol. The tips were transferred to a 2M aqueous solution of NaOH. Tips were rinsed in 100 μL water, followed by rinsing in 100 μL ethanol. The tips were then allowed to air dry to remove excess ethanol. The tips were transferred to a solution of 2% (v/v) trimethoxy-silane in anhydrous toluene. This step was performed in a glass container. The reaction was allowed to proceed, and the tips were rinsed in 100 μL ethanol. The tips were then rinsed in 100 μL water, and then rinsed in 100 μL ethanol. The tips were transferred to a 100 μL solution of 2 mM sTCO-amine in ethanol, and then rinsed in 100 μL ethanol, followed by rinsing in 100 μL water. The tips were transferred to a 40 μL solution of 60 μg/mL of tetrazine containing protein for loading protein or a 60 μg/mL solution of tetrazine PEG for creating a blocked tip. The tips were stored in 100 μL water until ready to test.

BLI measurements were measured as follows. Signal was expressed as wavelength shift in nm. The equipment vendor's recommended setting was followed on the equipment. The response was collected upon placing probes in analyte solutions at fixed or different concentrations depending on the experiment objective. Typically triplicates were collected, averaged and standard deviations were calculated. During a device prototype development process, the microfluidic membrane/channel pattern was designed using appropriate computer-aided design software (e.g. Solid Works) and fabricated on the upper surface of the membrane using a removable mask, which maintained hydrophilic areas for assay integration and fluid flow. The fabrication process was done using controlled aerosolized deposition of polycaprolactone (PCL) over unmasked areas. This patterned the device by generating hydrophobic barriers, while maintaining the hydrophilic features (e.g. fluidic channels, assay/sample zones etc.) on the GMF surface protected by the mask. The PCL solution composition was optimized to achieve the maximum device performance as required. Measures were taken to minimize and quantify the effect of mask removal on the GMF surface and to minimize performance variations between devices. Wicking speed of each channel was assessed by manipulating surface free energy and channel dimensions. Alternatively, PCL solution may be printed onto the configurable substrate.

The device was then tested by incorporating a Protein A-IgG color developing ELISA assay protocol, in which assay reagents were deposited within microchannels and the assay area was functionalized with a protein loading protocol. The functionalization and protein loading protocol are discussed with regards to Table 1 and Table 2, above.

In some examples, the reagents were loaded on the assay by treating the surface of the substrate with NaOH, followed by trimethoxysilane/toluene and which results in trimethoxysilane bound on the surface. The surface was then treated with TCO—NH2, resulting in TCO being bound to trimethoxysilane. The substrate surface was then treated with the tetrazine-modified protein and the Tet-PEG polymer (e.g., Tet-PEG-5K), resulting in the bioorthogonal tethered protein being tethered to a first portion of the volume of TCO and the Tet-PEG polymer being bound to a second portion of the volume of TCO. The surface was then treated with sucrose.

As previously described, the assay region included a TCO bound to the substrate (via a silane coupling agent) that is tethered to a tetrazine-modified protein configured to bind to a target analyte in the sample. The additional reagents were then subsequently input to the assay region. The assay region was then exposed to the additional detection reagents. The additional detection reagents may include a MS (e.g., TMB), and amplification enhancement reagents including peroxide, Dopamine and an additional amount of HRP, which interact to produce a detectable indicator. The detectable indicator signal was detected, such as by reading in an ELISA reader.

Genetic code expansion (GCE), is of great use in biomedical research and development of therapeutics. Bioconjugate materials that incorporate site-specifically incorporated ncAAs form well-organized, highly uniform biomolecular monolayers spontaneously. Compared to conventional immobilization strategies, configurable substrates of the present disclosure increase protein binding efficiency, signal fidelity and reliability because: 1. Bioorthogonal orientation and length. 2. Controlling protein surface concentration, e.g. substoichiometric loading, and uniformity closely approximates pseudo first-order binding kinetics.

Figure 4:
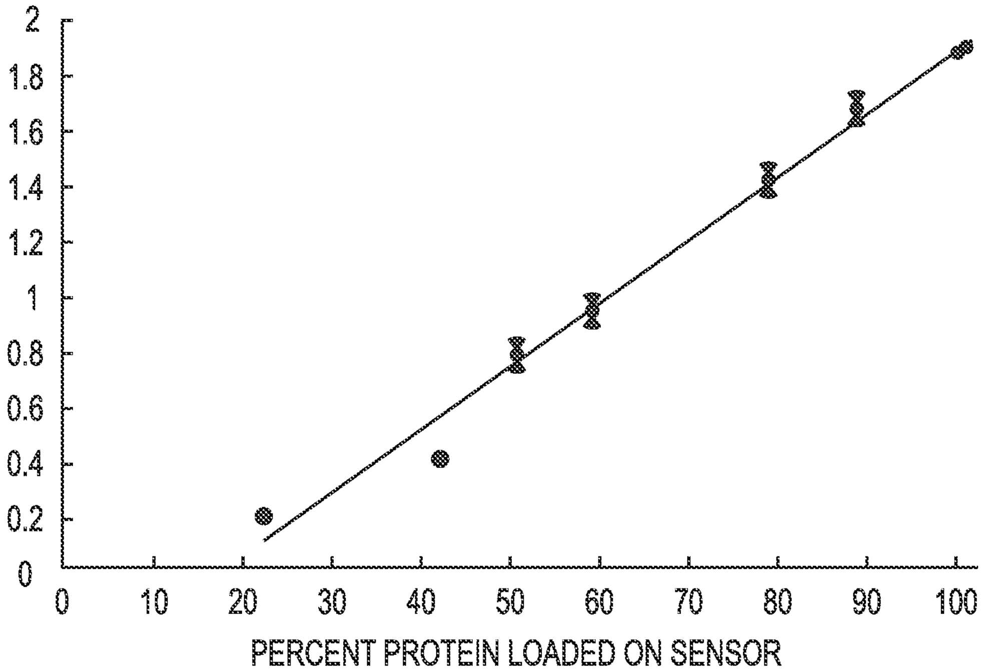
FIG. 4 illustrates the effect of protein concentration and reproducibility via biolayer interferometry (BLI) assays tests performed by three individuals, in accordance with the present disclosure.

FIG. 4 illustrates the effect of protein concentration and reproducibility via biolayer interferometry (BLI) assays tests performed by three individuals, in accordance with the present disclosure. The concentration of a surface attached protein A fragment was offset by increasing the concentration of a competing non-IgG-binding surface attached protein while the IgG concentration was kept constant. The x-axis of FIG. 4 represents the percent protein loaded on the sensor, such as the concentration of the surface attached protein as discussed with regards to FIG. 2. FIG. 4 illustrates that as the concentration of surface attached protein increased, the signal increased reproducibly as a function of the surface protein.

Figure 5:
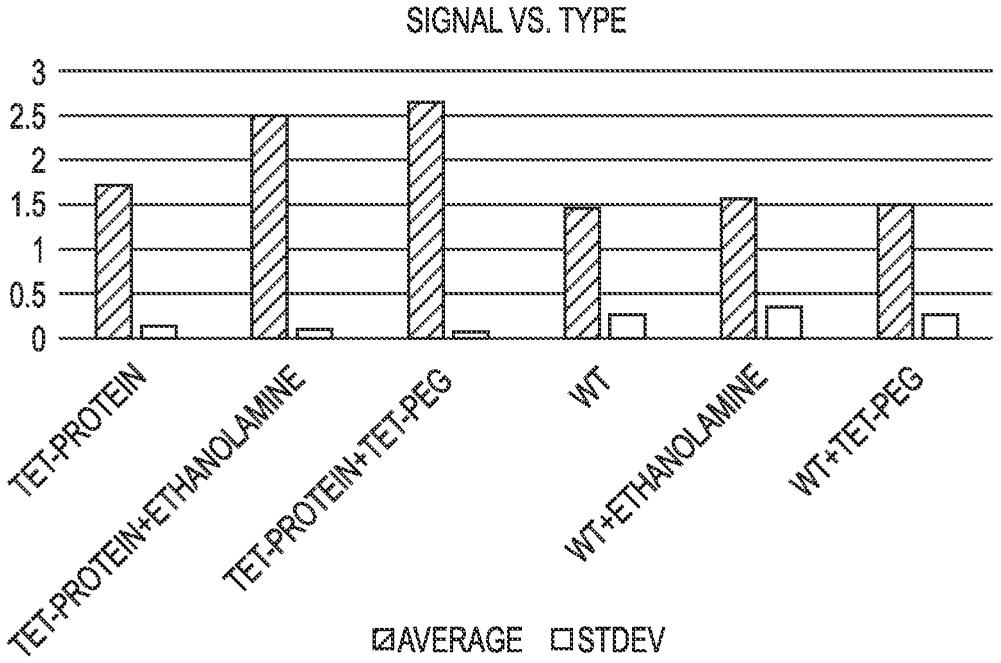
FIG. 5 illustrates the effect of tethering, ethanolamine and tet-PEG on signal intensity, in accordance with the present disclosure.

As illustrated in FIG. 5, the signal intensity was consistently higher when protein tethered to tetrazine was used as compared with non-tethered wild type (WT) with reproducible results. Signal intensity was measured via the BLI protocol as described with regards to FIG. 4. These results indicate that immobilizing a protein ligand to the configurable substrate via a tetrazine tether, as discussed herein, improved signal intensity as measured by BLI and suggests that use of tetrazine tethers results in improved binding capacity of a configurable substrate.

FIG. 5 also illustrates the effect of ethanolamine and tet-PEG on signal intensity, in accordance with the present disclosure. Signal intensity was measured via the BLI protocol as described with regards to FIG. 4. the data of FIG. 5 illustrate that the addition of Tet-PEG or ethanolamine improved signal for tethered protein but not for untethered protein. This data suggests that by controlling the concentration of ligand tethered to the configurable surface, using Tet-PEG or Tet-ethanolamine, configurable substrates of the present disclosure resulted in increased protein binding efficiency, signal fidelity and reliability.

Figure 6:
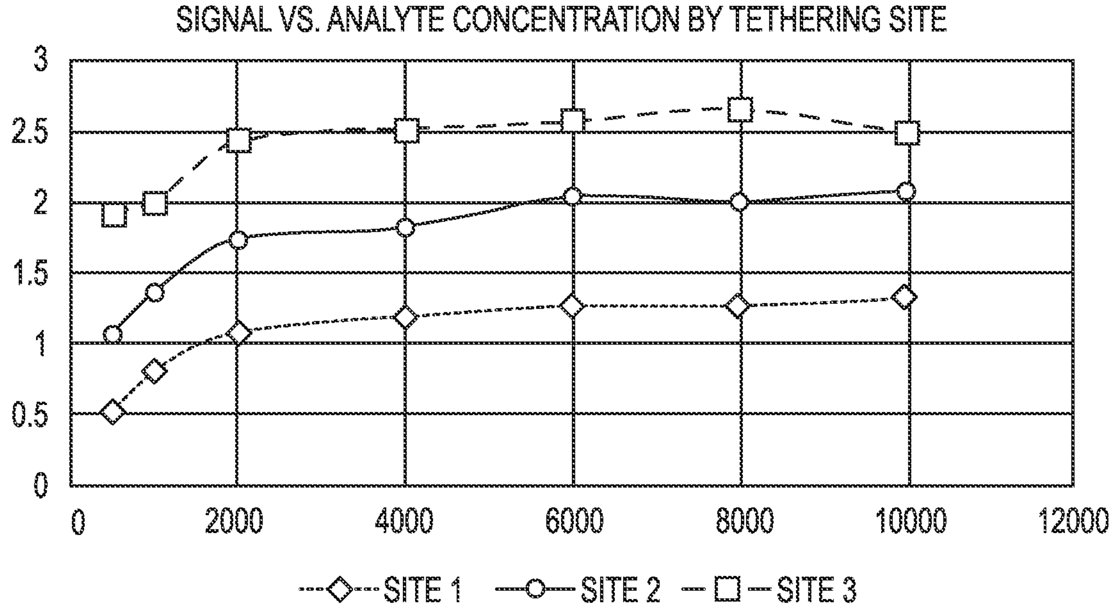
FIG. 6 illustrates the effect of tethered protein orientation on signal intensity, in accordance with the present disclosure.

FIG. 6 illustrates the effect of tethered protein orientation on signal intensity, in accordance with the present disclosure. The effect of protein orientation was measured via the BLI protocol as described with regards to FIG. 4. The Protein A tetrazine anchor was inserted, via ncAA into 3 different positions-on either side of the protein and on the side facing away from the IgG binding site. The data in FIG. 6 illustrate that over a wide range of analyte (IgG) concentration, site 3 consistently had a stronger signal than the other sites, while site 1 has weaker signal than other two sites.

Figure 7:
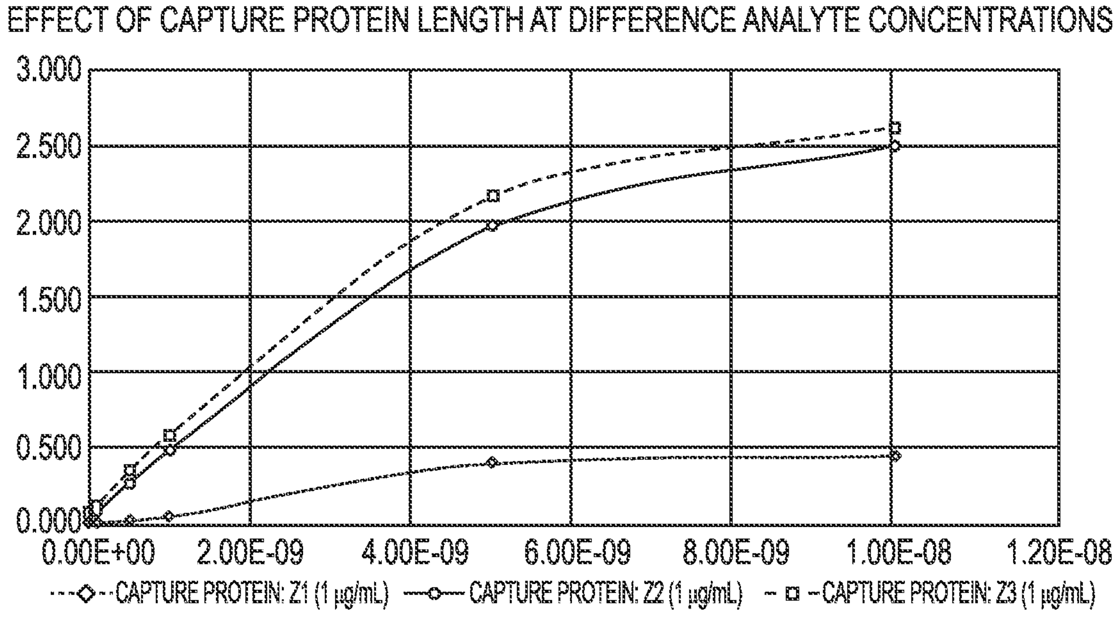
FIG. 7 illustrates the effect of tethered protein length on signal intensity, in accordance with the present disclosure.

FIG. 7 illustrates the effect of tethered protein length on signal intensity, in accordance with the present disclosure. The effect of tethered protein length on signal intensity was measured via an ELISA assay comparing three capture proteins with different length. The length of the capture protein was "Z3" which is a trimer (e.g., three copies) of a tet-modified protein or tet-modified protein fragment, "Z2" which is a dimer (e.g., two copies) of a tet-modified protein or tet-modified protein fragment, or "Z1" which is a tet-modified protein or tet-modified protein fragment.

As illustrated in FIG. 7, the capture protein length had significant impact on the signal at the same analyte concentration. Both Z3 and Z2 had significantly higher signal than Z1, which suggests that as the length of the tet-modified protein or tet-modified protein fragment increased, a stronger signal was achieved and therefore stronger binding capacity for the configurable substrate. Doubling the number of binding domains increased signal significantly.

Figure 8:
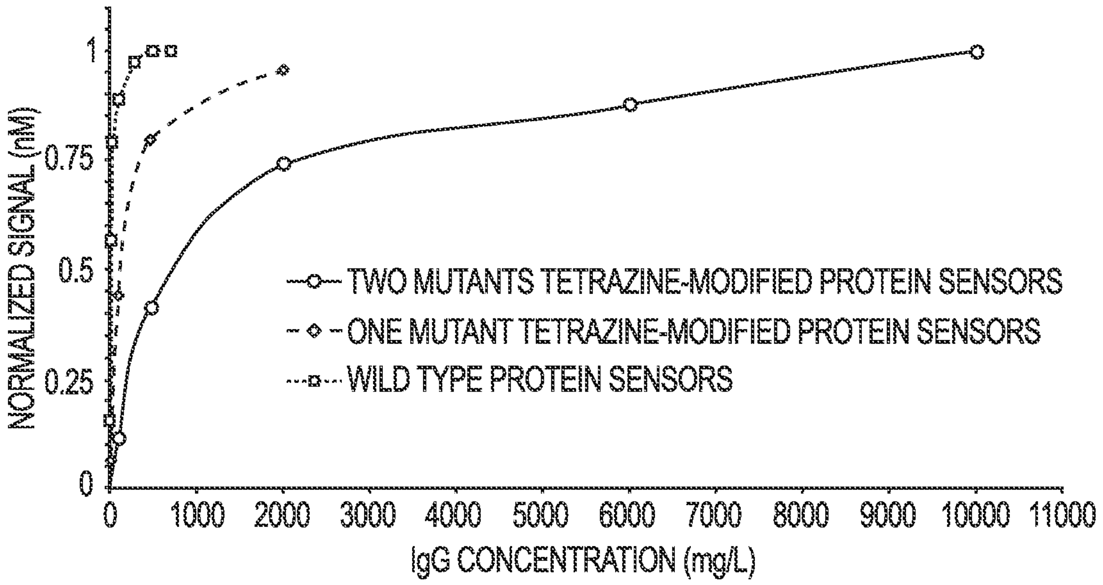
FIG. 8 illustrates the effect of combining multiple ligands with different binding affinities, in accordance with the present disclosure.

FIG. 8 illustrates the effect of combining multiple ligands with different binding affinities, in accordance with the present disclosure. As discussed herein, an assay device of the present disclosure can increase the dynamic range of detection by including multiple different tet-modified proteins or tet-modified protein fragments on the configurable substrate. In addition, proteins of different affinities can be reengineered for a given analyte so that the combination of two or more of these proteins loaded together demonstrates multiplexing capability, i.e. combines the Kd of two or more ligands, and provides for a wider range of binding activity on the biosensor. As demonstrated in FIG. 8, a case study was performed to demonstrate a wider dynamic range (WDR) for Protein A binding to human IgG by combining two mutants of Protein A ligands on the surface of the configurable substrate. With the appropriate capture ligand, analytes can be selected with the appropriate affinities/avidities (Kd values) suited for the chosen target analyte. Highly concentrated samples can underestimate concentration while highly diluted samples can overestimate concentrations. As shown the sensors with two mutants tetrazine-modified proteins yielded wider dynamic range of detection than those with either one mutant tetrazine-modified protein or the wild type without the tetrazine tethering. Sensors with tetrazine-modified protein has wider dynamic range of detection than that with wild type. The present disclosure describes an immunoassay test method that has a wide dynamic range so that monitoring titer can be done easily, cutting down on time and resources spent on sample preparation and redoing assays if results are unacceptable. This makes it possible to assess titer in crude samples without needing dilution because high expression targets drown out background noise. With a wide dynamic range of Protein A-coated sensors, it is possible to determine the amount of analyte for concentrations of up to 10 g/L.

Investigation using ELISAs explored increasing the dynamic range of the assay and increasing the upper limit of detection to develop an assay that did not require extensive sample processing (e.g. dilutions), which facilitate monitoring and quantitative analysis within the monoclonal antibody manufacturing community. Assays have been performed with several ELISA substrates, including glass, gold, maleic anhydride, carboxyl. N-hydroxysuccinimide, and N-oxysuccinimide-coated (NOS) plates. These assays were successful. Developing the lower range of the assay enables more sensitive assays for COVID-19 and, in the long-term, other pathogens, creating an analyte detection platform. An example of studies with Protein A deposited via its tetrazine tether onto glass-lined, 96-well microplates functionalized with silane and a TCO anchor is shown in Table 3. As shown in Table 3, p values demonstrate significant difference between blanks and IgG concentrations down to at least 100 μg/mL.

TABLE 3

T-Test p Values for Detecting IgG using two Z1 concentrations

| IgG Concentration (/mL) | Z1 4 μg/mL | Z1 40 μg/mL |
|---|---|---|
| 100 ng | 0.01 | 0.00 |
| 10 ng | 0.00 | 0.00 |
| 1 ng | 0.00 | 0.00 |
| 500 pg | 0.00 | 0.00 |
| 100 pg | 0.00 | 0.00 |
| 10 pg | 0.05 | 0.01 |
| 1 pg | 0.18 | 0.00 |

Figure 9:
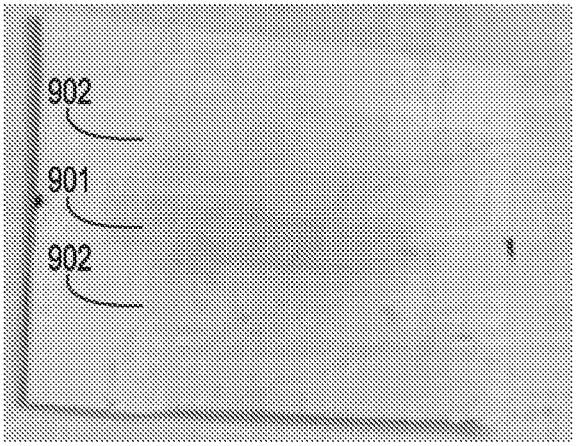
FIG. 9 illustrates results of printing, and other controlled deposition of reagents, in accordance with the present disclosure.

FIG. 9 illustrates results of printing, and other controlled deposition of reagents, in accordance with the present disclosure. Shown here is the result of a TMB flow through assay by selectively deposited lines of silane, TCO and protein. The silane line was dispensed using a dispenser. The TCO line was printed using a thermal inkjet printer on top of the silane line. The Protein A line was printed on top of the TCO line using a thermal inkjet printer. IgG and conjugate/TMB were applied to the whole membrane sequentially. As illustrated in FIG. 9, a dark line at 901 is visible representing the binding of silane, TCO, and protein A deposited on the membrane, demonstrating the bioorthogonal tethered protein tethered to the membrane surface. Bleed of the conjugate/TMB is seen in lighter lines 902 adjacent to the tethered protein.

Figure 10:
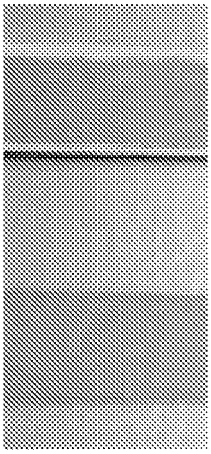
FIG. 10 illustrates a PCL defined channel, in accordance with the present disclosure.

FIG. 10 illustrates an example PCL defined channel, in accordance with the present disclosure. Shown on top is a GMF strip coated with PCL on the edges (as shown by the thin white lines). At the bottom of the figure is a GMF strip without PCL on the edges (as shown by the absence of thin white lines defining the channel). Dyed liquid was wicked through the strips. It can be seen that the fluid has flowed within the confines of the PCL defined channel, demonstrating that selective hydrophobic coating can be used to define fluidic channels for a configurable substrate, as disclosed herein.

Figure 11:
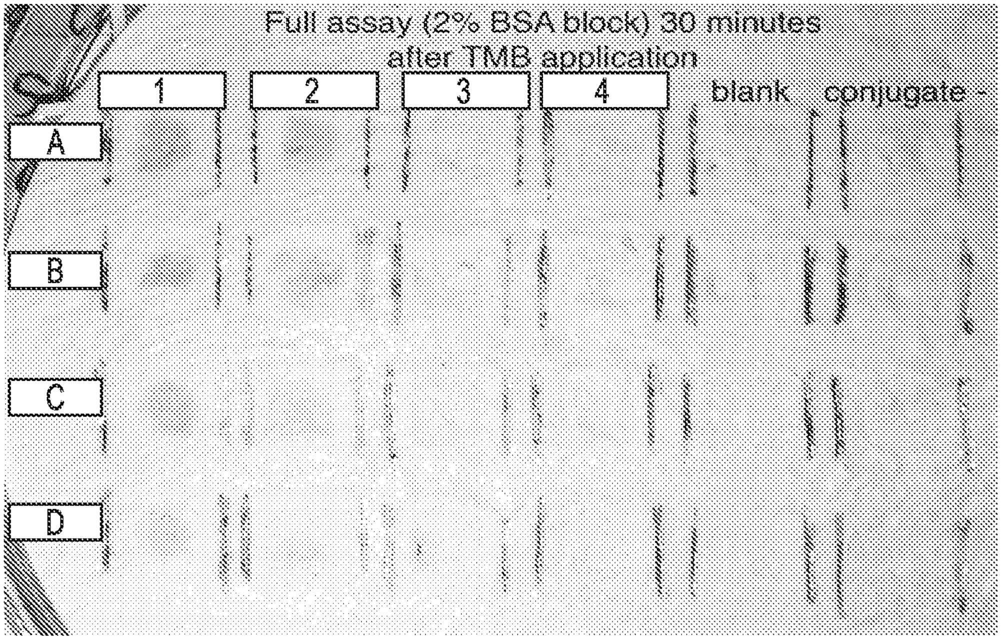
FIG. 11 illustrates PCL defined wells, in accordance with the present disclosure.

FIG. 11 illustrates PCL defined wells, in accordance with the present disclosure. As shown here, individual wells on GMF were created through a patterned hydrophobic coating of PCL. A flow through assay following described sequences was performed. The horizontal rows 1, 2, 3, and 4, represent decreasing capture protein concentration (from 1 with the greatest concentration to 4 with the least concentration) and vertical columns A, B, C, and D represent decreasing analyte concentration (from A with the greatest concentration to D with the least concentration). As shown in FIG. 11, control samples (e.g., blank and conjugate) did not show color where the color strength changed as a function of the capture protein and analyte concentration, and test samples with the highest capture protein concentration and highest analyte concentration resulted in the darkest color strength change.

The invention claimed is:

1. A method, comprising:

forming a plurality of bioorthogonal tethered proteins on a configurable substrate by attaching a tetrazine-modified protein or a tetrazine-modified functional protein fragment to trans-cyclooctene for each of the plurality of bioorthogonal tethered proteins, wherein the plurality of bioorthogonal tethered proteins includes a first ligand and a second ligand, the first ligand and second ligand being different from one another or being formed in a chain, and wherein a concentration and an orientation of the plurality of bioorthogonal tethered proteins are configurable on the configurable substrate.

2. The method of claim 1, wherein the first ligand and the second ligand are configured to bind to a target analyte.

3. The method of claim 2, wherein the first ligand and the second ligand are configured to bind to the same target analyte.

4. The method of claim 1, wherein the configurable substrate is porous.

5. The method of claim 1, wherein the configurable substrate is formed of glass, glass microfibers (GMF), a polymer polypropylene, paper, metal, metal fibers, carbon nanotube fibers (CNTF), non-woven material, plasma treated material, of silicon.

6. The method of claim 1, wherein the method further comprises:

applying the trans-cyclooctene on a base substrate in a configurable concentration; and contacting the tetrazine-modified protein or tetrazine-modified functional protein fragment with the deposited trans-cyclooctene.

7. The method of claim 6, comprising at least one of applying the trans-cyclooctene and contacting the tetrazine-modified protein or tetrazine-modified functional protein fragment with the trans-cyclooctene via printing.

8. The method of claim 1, wherein forming the plurality of bioorthogonal tethered proteins includes depositing a silane coupling agent to at least a portion of the configurable substrate and contacting the trans-cyclooctene with the silane coupling agent.

9. The method of claim 1, wherein forming the plurality of bioorthogonal tethered proteins includes:

depositing a volume of the trans-cyclooctene to the configurable substrate in an assay region of a microfluidic device;

attaching each of the tetrazine-modified protein or tetrazine-modified functional protein fragment to at least a first portion of the trans-cyclooctene; and optionally, attaching a tetrazine-containing polymer to a second portion of the trans-cyclooctene.

10. The method of claim 1, further including forming at least a portion of a fluidic device by selectively depositing a hydrophobic barrier on the configurable substrate.

11. A configurable substrate of a fluidic device, comprising:

an assay region of the configurable substrate including a plurality of bioorthogonal tethered proteins, wherein the plurality of bioorthogonal tethered proteins includes:

a plurality of trans-cyclooctenes tethered to a surface of the configurable substrate; and a plurality of tetrazine-modified proteins or tetrazine-modified functional protein fragments tethered to the plurality of trans-cyclooctenes, wherein the plurality of tetrazine-modified proteins or tetrazine-modified functional protein fragments include a first ligand and a second ligand, the first ligand and second ligand being different from one another or being formed in a chain, wherein a concentration and an orientation of the plurality of bioorthogonal tethered proteins are configured on the configurable substrate.

12. The configurable substrate of claim 11, wherein the configurable substrate is a porous substrate.

13. The configurable substrate of claim 11, wherein the configurable substrate is formed of glass, glass microfibers (GMF), a polymer, polypropylene, paper, metal, metal fibers, carbon nanotube fibers (CNTF), non-woven material, plasma treated material, or silicon.

14. The configurable substrate claim 11, further comprising a tetrazine containing polymer selectively attached to the trans-cyclooctene.

15. The configurable substrate of claim 11, wherein the configurable substrate contains a polycaprolactone or hydrophobic barrier.

16. The method of claim 1, wherein the first ligand and the second ligand are formed in the chain.

17. The method of claim 16, wherein the first ligand and the second ligand in the chain are the same.

18. The method of claim 1, wherein a signal provided by the first ligand and the second ligand in the chain has a greater intensity as compared to a combined signal provided by the first ligand and the second ligand.

19. The method of claim 1, wherein the first ligand and second ligand each contain at least one binding domain.

20. The method of claim 1, wherein a dynamic range of detection provided by the first ligand and the second ligand when the first ligand and second ligand are different from one another is greater than a dynamic range of detection provided by the first ligand and the second ligand when the first ligand and the second ligand are the same.

* * * * *